March 6, 1928.

R. M. CRIBBES 1,661,600

DRIVING MECHANISM OF THE FANS OF FORD AND LIKE ENGINES

Filed Sept. 17, 1925

Inventor
Robert Miller Cribbes
By Knight & Key
Attys

Patented Mar. 6, 1928.

1,661,600

UNITED STATES PATENT OFFICE.

ROBERT MILLER CRIBBES, OF COCKBURNSPATH, SCOTLAND.

DRIVING MECHANISM OF THE FANS OF FORD AND LIKE ENGINES.

Application filed September 17, 1925, Serial No. 56,912, and in Great Britain March 19, 1925.

This invention relates to driving mechanism for the fans of motor road vehicles and more particularly of engines of the Ford type in which the fan is driven from the engine crankshaft through belt gearing consisting of a flat endless belt passing around pulleys on the crankshaft and fan spindle.

The object of the present invention is to drive the fan by a link or V-type belt, thus providing a more efficient and positive drive and enabling more perfect cooling of the engine and radiator to be attained.

According to the present invention, a V-type pulley is fitted in place of or against the existing belt pulley on the engine crankshaft, and a corresponding V-type pulley is fitted in place of or against the existing belt pulley on the fan spindle. The V-type pulleys may be clamped to the existing pulleys and may be made of cast aluminium or any other suitable material. The drive is taken by a V shaped or link belt, such as the well-known Whittle belt.

The V-type pulley may, for example, consist of a ring split diametrically and clamped over the existing flat belt pulley by means of clamping bolts or screws passing through lugs on the two halves of the split ring.

The accompanying drawing illustrates the preferred embodiment of my invention wherein V-type pulleys replace the usual flat belt pulleys.

Figure 1:
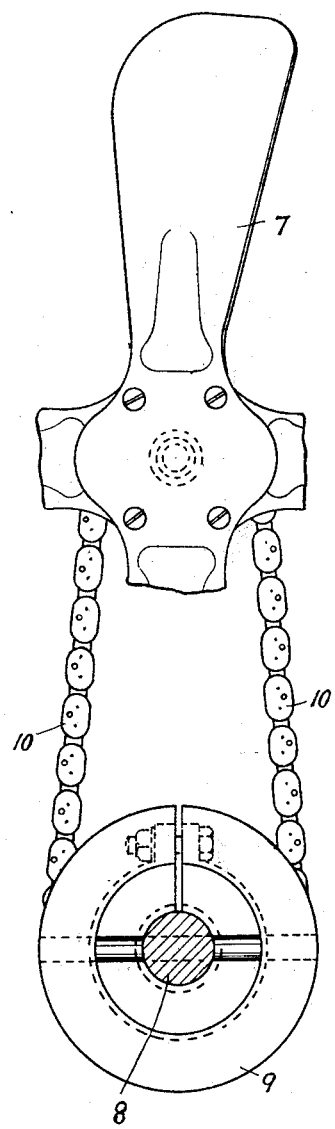
Figure 2:
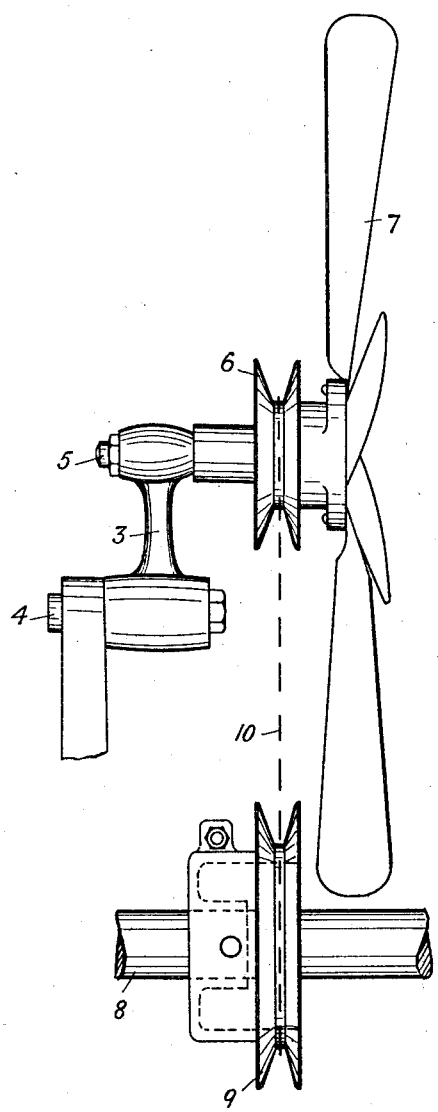

Fig. 1 is a front view of the fan assembly and Fig. 2 is a side view thereof.

Referring to the drawings, the fan assembly comprises the usual adjusting bracket 3 which is pivotally mounted at one end by means of a bolt 4 secured to part of the engine casing. The bracket 3 at its free end carries a fan spindle 5 on which is revolubly mounted a V-type fan pulley 6 carrying the fan 7. On the crankshaft 8 is fitted the fan drive pulley 9 which is also of the V-type as shown. The pulley 9 drives the fan pulley 6 through a link belt 10, which ensures an efficient and positive drive requiring little or no attention or adjustment.

I claim—

1. A combined fan drive pulley and starter unit comprising an annulus having a V-shaped groove in its periphery, a hollow boss at one side thereof, an internal hollow hub, an end web connecting said boss and hub, the whole of said parts being slit radially, a pair of lugs on the boss at each side of said slit, a clamping bolt passing through said lugs, aligned apertures in said boss and hub, a shaft on which said hub is mounted, and a pin adapted to be passed through said apertures and shaft so as to provide between the hub and boss a pair of cross members adapted to be engaged to rotate the unit.

2. A fan drive pulley comprising an annulus having a V-shaped groove in its periphery near its outer end, a hollow boss at the inner side thereof, an integral hollow hub, an end web connecting said boss and hub, aligned apertures in said boss and hub, a shaft on which said hub is mounted, and a pin adapted to be passed through said apertures and shaft in the rear of the grooved portion, said pin having bearing in the boss and hub on each side of the shaft, and said pin thus providing a pair of cross members between the boss and hub adapted to be engaged to rotate the pulley.

The foregoing specification signed at Edinburgh, Scotland, this 17th day of August, 1925.

ROBERT MILLER CRIBBES.